United States Patent [19]
Ando

[11] Patent Number: 5,187,434
[45] Date of Patent: Feb. 16, 1993

[54] APPARATUS FOR DETECTING MACHINING CONDITIONS OF A WORKPIECE

[75] Inventor: Shigenori Ando, Narashino, Japan

[73] Assignee: Seiko Seiki Kabushiki Kaisha, Japan

[21] Appl. No.: 617,570

[22] Filed: Nov. 26, 1990

[30] Foreign Application Priority Data

Dec. 8, 1989 [JP] Japan .................................. 1-317825

[51] Int. Cl.⁵ .......................... G01B 7/31; G01B 21/00
[52] U.S. Cl. ................................. 324/207.25; 324/262;
324/158 MG; 364/508; 364/551.02; 73/593;
73/660; 116/71; 340/682
[58] Field of Search ........ 324/263, 158 MG, 158 SM,
324/158 SY, 207.25, 262; 310/90.5; 73/660,
602, 587, 583, 659, 9, 7; 340/679, 680, 683, 682;
116/71; 364/506–508, 511, 512, 550, 552,
551.01, 551.02

[56] References Cited

U.S. PATENT DOCUMENTS

| | | | |
|---|---|---|---|
| 4,783,998 | 11/1988 | Sander | 73/660 |
| 4,793,186 | 12/1988 | Hurley | 73/660 X |
| 4,821,460 | 4/1989 | Wegmann | 73/660 X |
| 4,912,661 | 3/1990 | Potter | 73/660 X |
| 4,941,105 | 7/1990 | Marangoni | 73/660 X |
| 4,977,516 | 12/1990 | Shepherd | 73/660 X |

*Primary Examiner*—Gerard R. Strecker
*Assistant Examiner*—W. S. Edmonds
*Attorney, Agent, or Firm*—Bruce L. Adams; Van C. Wilks

[57] ABSTRACT

An apparatus for detecting machining conditions in a machine tool has a magnetic bearing for magnetically supporting a work spindle or a tool spindle. An exciting current detector is provided for detecting an exciting current of an electromagnet of the magnetic bearing. The exciting current corresponds to various machining conditions including the conditions when the machine tool starts operating, the tool contacts the workpiece to follow various unfinished faces, and a machining face condition of the workpiece during machining. The detection signals from the exciting current detector are inputted to a plurality of frequency band pass filters to discriminate the machining conditions. Comparators are provided to compare the output signals from the frequency band pass filters with a predetermined set of reference values, and comparative judgment signals are inputted to a control unit, thereby controlling the machine tool to automatically perform appropriate machining operations.

11 Claims, 3 Drawing Sheets

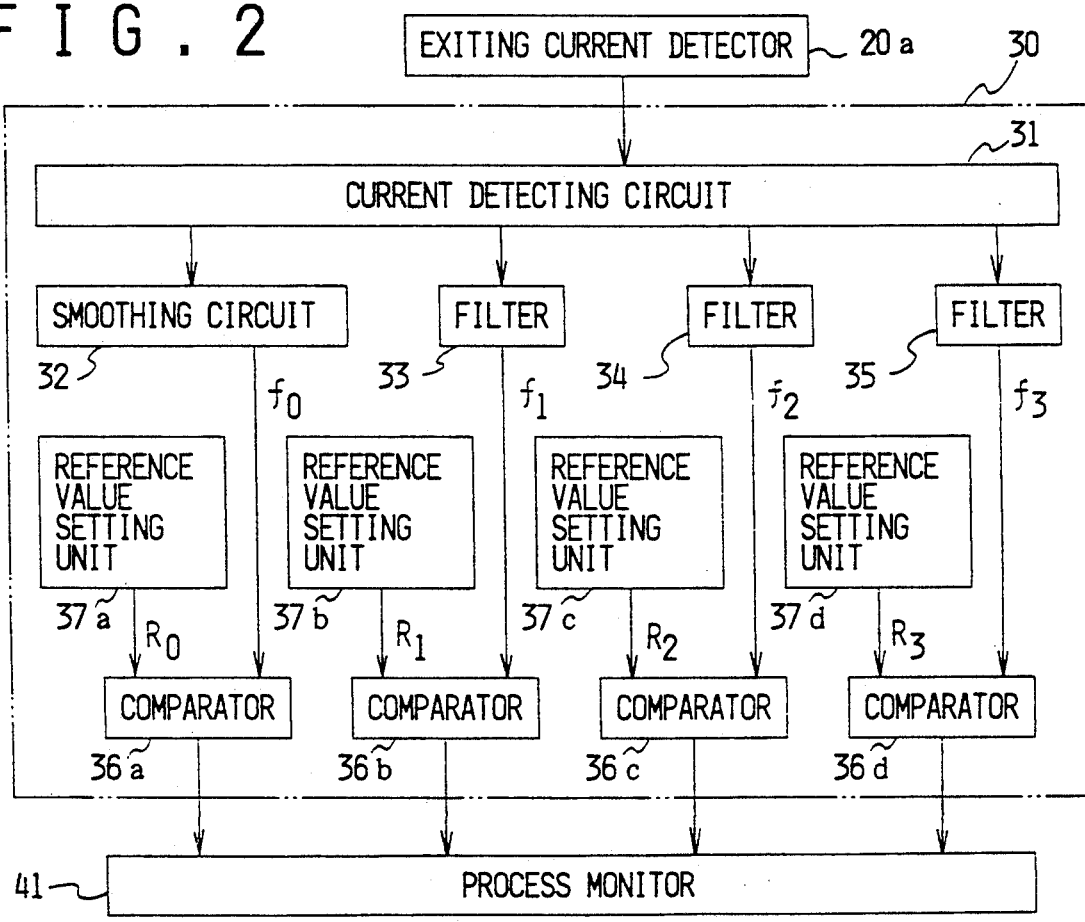

FIG. 3

STEP 1 — ATTACH A WORKPIECE TO THE CHUCK

STEP 2 — WORK SPINDLE AND WHEEL SPINDLE START ROTATING

STEP 3 — WORK HEAD TABLE AND WHEEL SPINDLE STOCK MOVE FORWARD

STEP 4 — WORK HEAD TABLE MOVE FORWARD
OPERATION OF THE GRINDING/MACHINING CONDITION DETECTION DEVICE STARTS

STEP 5 — OPERATION IS CHANGED OVER TO ROUGH GRINDING

STEP 6 — ROUGH GRINDING

STEP 7 — $f_3 \leq R_3$ ?
NO → REDUCE A TARGET VALUE OF THE ROUGH GRINDING STRENGTH TILL $f_3 = R_3$
YES ↓

STEP 8 — CONTINUE ROUGH GRINDING

STEP 9 — OPERATION IS CHANGED OVER TO FINE GRINDING

STEP 10 — $f_2 \leq R_2$ ?
NO → PERFORM ANY ONE OF PROCESSES (1), (2), (3) OR (4)
YES ↓

STEP 11 — CONTINUE FINE GRINDING

STEP 12 — WORK HEAD TABLE STOPS ; PERFORM SPARK-OUT

STEP 13 — WORK HEAD TABLE MOVES BACK

STEP 14 — WORK HEAD TABLE AND WHEEL SPINDLE STOCK RETURN TO ORIGINAL POSITIONS

STEP 15 — WORK SPINDLE STOPS ROTATING
DETACH THE WORKPIECE; ATTACH NEXT ONE TO THE CHUCK

APPARATUS FOR DETECTING MACHINING CONDITIONS OF A WORKPIECE

BACKGROUND OF THE INVENTION

1. Field of the Invention

The present invention relates to an apparatus for detecting machining conditions in a machine tool during a machining process.

2. Description of the Prior Art

Prior art techniques for detecting machining conditions in a machine tool during a machining process include detection of machining strength, vibrations, sounds, heat, machining power, machining dimensions (residual stock removal quantity) or an exciting current (particularly if a spindle is supported by a magnetic bearing).

In accordance with the prior art, machining strength may be detected by use of a distortion gauge or a piezoelectric element mounted on a work rest or a tool rest. Alternatively a distortion gauge may be mounted on a work bearing center or variations, may be detected in pocket pressure of a static pressure fluid bearing which bears a tool (workpiece) spindle.

In accordance with the prior art, vibrations and sounds may be detected by use of an AE sensor or a vibration sensor provided on the work rest, the tool rest bearing center or a shoe. Alternatively, the AE sensor or the vibration sensor may be attached to the tool (workpiece) spindle for bearing a rolling bearing.

In accordance with the prior art heat may be detected by heat detection sensors embedded in the workpiece and the tool.

In accordance with the prior art, detection of the machining power involves a detection of the rotary driving power of the tool (workpiece) spindle.

In accordance with the prior art machining dimensions may be detected on the basis of a difference between a cutting feed per stroke and dimensions of the workpiece during the machining process.

In accordance with the prior art, exciting current in a magnetic bearing may be detected by detecting the average exciting current.

The following defects are inherent in the above mentioned prior art techniques for detecting the machining conditions.

The detection of machining strength is limited to a case where the workpiece is movable within a given range while restricting the rigidity of a workpiece support. Also, detection of machining strength limits a bearing mode of the workpiece to the center bearing, and decreases the response to variations in speed.

The detection of vibrations and sounds is applied only to a narrow range of abnormalities and involves the use of a bearing to thereby damp the vibrations, causing a drop in S/N ratio because rolling vibrations are also detected.

The detection of heat is of little practicability and has poor response as well.

The detection of machining power is, in addition to a poor response, limited to the power acting in a tangential line alone and is insufficient for a grinding process wherein variations in power acting in a normal line are large.

The detection of machining dimensions has low response because it is detected after effecting the machining process.

The exciting current cannot be detected in a frequency domain which allows detection of the exciting current to be averaged.

In any case, the prior art detection efficiency is low. In addition, the prior art only provides simple condition detecting means which is inadequate for analyzing multiple conditions by highly accurate detection and to output the output signal capable of effecting the corresponding control over the machine tool.

SUMMARY OF THE INVENTION

It is an object of the present invention to provide an apparatus for detecting machining condition in a machine tool which has high accuracy and for analyzing and controlling multiple machine conditions. The apparatus for detecting machining conditions in a machine tool according to the present invention comprises: an exciting current detector for detecting exciting current set up in a power supply circuit of a magnetic bearing supporting a work spindle or a tool spindle; a variety of frequency band pass filters, connected to the exciting current detector, to which detection signals of the exciting current detector are inputted; and comparators for comparing output signals of the multiple frequency band filters with respective set values.

A change of the exciting current of the magnetic bearing is detected by the exciting current detector according to displacements with respect to the radial direction of the work spindle or the tool spindle. The displacements correspond to conditions under which the machine tool starts operating, and the tool contacts the workpiece to follow various unfinished faces, a machining condition and a machining face condition of the workpiece during machining. As a result of inputting the detection signals to the variety of frequency band pass filters, the machining conditions and the workpiece face condition are discriminated. The comparators compare the output signals from the frequency band pass filters with the set reference values. The respective conditions are judged from the comparative results. Comparative judgment signals are inputted to the control unit, thereby controlling the machine tool to automatically perform appropriate machining operations.

BRIEF DESCRIPTION OF THE DRAWINGS

FIG. 2 is a block diagram illustrating a grinding/machining condition detecting circuit of the grinding/machining condition detecting apparatus in the embodiment of the invention; and FIG. 3 is a flowchart showing control processes of the internal grinding machine incorporating the grinding/machining condition detecting apparatus in the embodiment of the invention.

DETAILED DESCRIPTION OF THE PREFERRED EMBODIMENT

Figure 1:
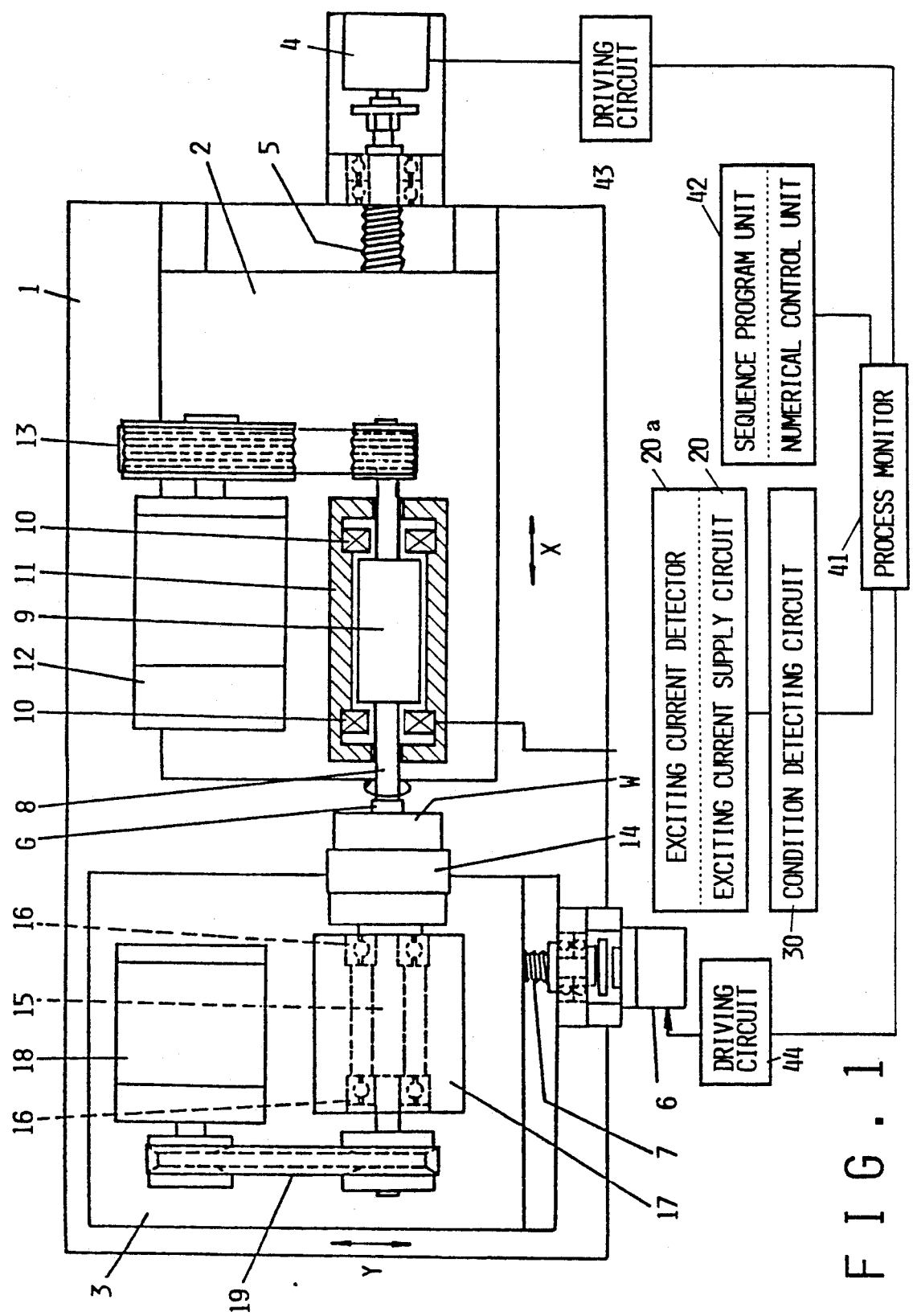
FIG. 1 is partly a plan view of an internal grinding machine in an embodiment of the present invention and partly a block diagram of an apparatus for detecting grinding machining conditions incorporated therein.

An embodiment of the present invention will hereinafter be described referring to the accompanying drawings.

There is exemplified an internal grinding machine as a machine tool to which an apparatus for detecting machining conditions according to the present invention is applied.

Mounted on a bed 1 in FIG. 1 are a wheel spindle stock 2 slidable in X-axis directions and a work head table 3 slidable in Y-axis directions. The wheel spindle stock 2 is moved back and forth in the X-axis directions by a servo motor 4 through a feed screw mechanism 5. The work head table 3 is moved back and forth in the Y-axis directions by a servo motor 6 through a feed screw mechanism 7.

A wheel head 11 and a motor 12 are mounted on the wheel spindle stock 2. The wheel head 11 rotatably bears a main wheel spindle 9 fitted at its top end with a wheel spindle 8 of a grinding stone G with the aid of magnetic bearings 10, 10 in the X-axis directions. The main wheel spindle 9 is rotationally driven by the motor 12 via a belt transmission mechanism 13.

Mounted on the work head table 3 are a work head 17 and a motor 18. The work head 17 rotatably bears a work spindle 15 provided at its top end with a chuck 14 with the help of rolling bearings 16, 16 in the X-axis directions. The work spindle 15 is rotationally driven by the motor 18 via a belt transmission mechanism 19.

A grinding program control unit equipped with the machining condition detecting apparatus is composed of: an exciting current supply circuit 20 which includes an exciting current detector 20a of the magnetic bearing 10 on the wheel side; a grinding/machining condition detecting circuit 30 for processing and judging detecting signals inputted from the exciting current detector 20; a process monitor 41; a sequence program unit/numerical control unit 42; and feed driving circuits 43 and 44.

As depicted in FIG. 2, the grinding/machining condition detecting circuit 30 consists of a current detecting circuit 31, a smoothing circuit 32, a workpiece rotational frequency band pass filter 33, a workpiece rotational frequency partial band pass filter 34, a wheel spindle rotary bending resonant frequency band pass filter 35, comparators 36a through 36d and reference value setting units 37a through 37d. These components are connected to operate in the following manner.

The current detecting circuit 31 converts, when inputting exciting current detecting signals from the exciting current detector 20a of the exciting current supply circuit 20, these signals into voltages. Thus, the converted exciting current detecting signals are inputted respectively to the comparators 36a through 36d via the smoothing circuit 32 (for time-averaging the displacement signals), the workpiece rotational frequency band pass filter 33 (Nw pass filter), the workpiece rotational frequency partial band pass filter 34 (Nw-nNw pass filter) and the wheel spindle rotary bending resonant frequency band pass filter 35 (Nc pass filter). Inputted to the comparators 36a are set reference value signals set in the reference value setting units 37a through 37d. The comparators 36a through 36d compare the inputted displacement detecting signals with the set reference value signals. If there are differences therebetween, difference signals are inputted to the process monitor 41.

The process monitor 41 and the sequence program unit/numerical control unit 42 input command signals to driving circuits 43 and 44 of the feed servo motors 4 and 6. The servo motor 4 connected to the driving circuit 43 is controllably driven by this circuit 43 upon being inputted. The servo motor 6 connected to the driving circuit 44 is controllably driven by this circuit 44 upon being inputted.

The operation and function of the grinding program control unit will now be described. Grinding/machining processes will be demonstrated by FIG. 3.

The operation starts with chucking a workpiece W by use of a chuck 14 (step 1).

A monitor 18 rotates at a predetermined velocity in response to a command from the sequence program unit/numerical control unit 51. As a result, the work spindle 15, i.e., the workpiece W is rotationally driven via the belt transmission mechanism 19. Simultaneously, the motor 12 functions to rotationally drive the main wheel spindle 9, viz., the grinding stone G through the belt transmission mechanism 13 (step 2).

The servo motor 6 is controlled by the control unit and operates to move forward (downward in FIG. 1) the work head table 3 via the feed screw mechanism 7. A hollow portion of the workpiece W is positioned to confront the grinding stone G. On the other hand, the servo motor 4 is controlled by the control unit and operates to move forward (leftward in FIG. 1) the wheel spindle stock 2, through the feed screw mechanism 5. The grinding stone G is forced to enter the hollow portion of the workpiece W (step 3).

The work head table 3 is advanced at a slightly high gap-eliminate velocity by the actuation of the servo motor 6. Then starts the operation of the grinding/machining condition detecting unit (step 4).

The exciting current detector 20a dynamically detects an exciting current in the magnetic bearings 10, 10 which support the wheel spindle 9 and the exciting current changed with the displacement of the wheel spindle 9 by grinding. Upon a detection of the exciting current an exciting current detection signal is inputted to the current detecting circuit 31, wherein the current detection signal is converted into a voltage signal. The voltage signals are inputted to a smoothing circuit 32, a workpiece rotational frequency band pass filter 33, a workpiece rotational frequency partial band pass filter 34, and wheel spindle rotary bending resonant frequency band pass filters 35. As a consequence of detecting the exciting current with the exciting current detector 20a incorporated in the exciting current supply circuit 20, there are obtained the exciting current detection signals having frequencies corresponding to the respective workpiece conditions and grinding conditions.

Until the grinding stone G contacts an inner peripheral face of the workpiece W, a detected exciting current signal has mainly a frequency Ng component depending on a rotational accuracy of the wheel spindle 8 which is inputted to the current detecting circuit 31. There is, however, no output signal from the respective filters.

The grinding stone G contacts the inner peripheral face of the workpiece W, then starts the grinding process. At this time, the exciting current detecting signal corresponding to a condition of the inner peripheral face of the workpiece is overlapped with the detected exciting current signal having mainly the frequency Ng component depending on the rotational accuracy of the wheel spindle 8. The overlapped signals are inputted to the current detecting circuit 31. The detecting signal is then outputted from any one of the smoothing circuit 32, the workpiece rotational frequency band pass filter 33 and the workpiece rotational frequency partial band pass filter 34.

For instance, if neither eccentricity nor distortion appears on the inner peripheral face of the workpiece W, a detecting signal $f_0$ coming from the smoothing circuit 32 is outputted.

If the inner peripheral face of the workpiece W undergoes a sectional distortion to assume an ellipse or 3-lobe skew circle or n-lobe skew circle, detecting signals $f_2$ of each partial frequency band is outputted from the band pass filter 34 prior to the detecting signal $f_0$. If the inner peripheral face of the workpiece W is eccentric with respect to the rotary axial line of the work spindle 15, the first priority is given to outputting of the detecting signal $f_1$ from the band pass filter 33.

The output signals $f_0$, $f_1$, and $f_2$ in any cases are inputted to the comparators 36a through 36c. These output signals are compared with reference values $R_0$, $R_1$, and $R_2$ which are set in the setting units 37a through 37c. As a result of comparison, if it is greater than the set reference value, the detecting signal is inputted to the monitor 41.

In consequence of this, the servo motor 6 is controlled via the feed driving circuit 44 by signals $A_0$, $A_1$, and $A_2$ outputted from the monitor 41. The operation is changed over to rough grinding (step 5).

Rough grinding is effected with a predetermined rough grinding strength. As rough grinding cutting advances, the output signals $f_0$, $f_1$, and $f_2$ typically augment. When the grinding stone G contacts the entire periphery, the output signals $f_1$ and $f_2$ are reduced down to zero. So far as a cutting quality of the grinding stone G is not deteriorated, the output signal $f_0$ ceases to increase and is kept constant (step 6).

If the exciting current detecting signal $f_3$ from the band pass filter 35 is larger than the reference value $R_3$ set by the setting unit 37d during a rough grinding feed, the detecting signal $A_3$ is inputted to the monitor 41. As a result, a predetermined target value of the rough grinding strength in the process monitor 41 is reduced until the exciting current detecting signal $f_3$ from the band pass filter 35 reaches the reference value $R_3$ set by the setting unit 37d. The servo motor 6 undergoes control to be decelerated correspondingly via the feed driving circuit 44 (step 7).

Thus, rough grinding continues with a predetermined rough grinding strength by which the exciting current detecting signal $f_3$ from the band pass filter 35 becomes smaller than the reference value $R_3$ set by the setting unit 37d until reaching a predetermined fine grinding changeover point (step 8).

For example, the servo motor 6 is controlled via the feed driving circuit 44 by the signals outputted from the monitor 41 when inputting, to the process monitor 41, the signals at the time of reaching the fine grinding strength changeover point—i.e., when a residual grinding allowance comes to a set value, a sizing signal set by a sizing unit is outputted, a positional signal of the work head table 3 comes to a predetermined level, or the cutting program numerical value reaches a predetermined value (step 9).

If the exciting current detecting signal $f_2$ from the band pass filter 34 is not smaller than the reference value $R_2$ set by the setting unit 37c even when coming into the fine grinding process, the detecting signal is inputted to the process monitor 41. On that occasion, any one of the following processes is to be performed.

(1) The predetermined fine grinding operation continues as it is. Even at the termination of fine grinding, if the exciting current detecting signal $f_2$ transmitted from the workpiece rotational frequency partial band pass filter 34 is not less than the reference value $R_2$ set by the reference value setting unit 37c, the workpiece W concerned is abandoned.

(2) The predetermined target value of the fine grinding strength in the monitor 41 is reduced until the exciting current detecting signal $f_2$ from the band pass filter 34 reaches the reference value $R_2$ set by the setting unit 37c. The servo motor 6 is controlled to decrease the speed through the feed driving circuit 44. Fine grinding continues as it is till a fine grinding ending size is reached.

(3) Fine grinding is immediately stopped, and the workpiece concerned is abandoned.

(4) The predetermined target value of the fine grinding strength in the monitor 41 is reduced until the exciting current detecting signal $f_2$ from the band pass filter 34 reaches the reference value $R_2$ set by the setting unit 37c. The motor 18 is controlled to reduce the speed correspondingly through the driving circuit (not shown). The number of revolutions of the work spindle 15 is reduced (step 10). The fine grinding operation is effected with the predetermined fine grinding strength. In normal fine grinding, only detected displacement signal having mainly the frequency Ng component which is substantially dependent on the rotational accuracy of the wheel spindle 8 is inputted to the current detecting circuit 31. So far as the cutting quality of the grinding stone G is not deteriorated, the output signal $f_0$ is also decreased and kept constant (step 11).

When the workpiece reaches finishing dimensions by fine grinding, for instance, the sizing signal set by the sizing unit is inputted to the process monitor 41. The servo motor 6 is stopped via the feed driving circuit 44 by the signal outputted from the monitor 41. Then, spark-out is performed. The output signal $f_0$ is also decreased. The detected exciting current signal comes to have chiefly the frequency Ng component depending on the rotational accuracy of the wheel spindle 8 (step 12).

Thereafter, the servo motors 4 and 6 are controlled to operate through the feed driving circuits 43 and 44 by the signals outputted from the monitor 41. After the work head table 3 has moved back via the feed screw mechanism 7 (step 13), the wheel spindle stock 2 also retreats via the feed screw mechanism 5. The grinding stone G exits from inside of the hollow portion of the workpiece W, while wheel spindle stock 2 returns to its original position. Simultaneously, the work head table 3 moves further back to the original position (step 14).

The motor 18 is stopped by the command of the sequence program unit/numerical control unit 51, as a result of which the work spindle 15, i.e., the workpiece W stops rotating. The workpiece W is detached and attached for replacement by means of the chuck 14 (step 15).

In the above embodiment, a displacement of the wheel spindle 9 is detected with the exciting current detector 20a as a change of the exciting current in the magnetic bearing 10. The detected exciting current signal is inputted to the current detecting circuit 30. It is not difficult to understand that the magnetic flux detecting signal may be inputted into the magnetic flux detecting circuit by detecting a change of the magnetic flux of the electromagnet in the magnetic bearing with the magnetic flux detector instead of detecting the exciting current.

While the machining in the above embodiment is the internal grinding, the present invention can be applied to the other kinds of grinding and cutting processes.

According to the machining condition detecting apparatus of the invention, the conditions during the grinding/cutting operations are detected with a high accuracy. A variety of conditions are thereby analytically detected. It is therefore feasible to obtain the output signals capable of correspondingly controlling the machine tool. The machining condition detecting apparatus of the invention makes possible the highly accurate adaptive control of the machine tool.

What is claimed is:

1. An apparatus for detecting machining conditions of a workpiece in a machine tool comprising:

an exciting current supply circuit for generating an exciting current;

magnetic bearing means including at least one electromagnet coupled to and controlled by the exciting current supply circuit for magnetically supporting at least one of a work spindle for holding the workpiece and a tool spindle in a predetermined rotating position;

an exciting current detector included in said exciting current supply circuit for detecting the exciting current generated by said exciting current supply circuit for controlling each electromagnet of said magnetic bearing means;

a plurality of frequency band pass filters, coupled to said exciting current detector, for filtering detection signals outputted from said exciting current detector and for outputting signals corresponding to machining conditions; and comparators, each coupled to one of said plurality of frequency band pass filters, for comparing output signals of said frequency band pass filters with respective set values dependent on a predetermined machining conditions.

2. The apparatus according to claim 1, wherein one of said plurality of frequency band pass filters comprises a workpiece rotational frequency band pass filter which passes a predetermined frequency component corresponding to eccentricity of a machining face of the workpiece.

3. The apparatus according to claim 1, wherein one of said plurality of frequency band pass filters comprises a workpiece rotational frequency partial band pass filter which passes a predetermined frequency component corresponding to sectional distortion of a machining face of the workpiece.

4. The apparatus according to claim 1, wherein one of said plurality of frequency band pass filters comprises a tool spindle rotary bending resonant frequency band pass filter which passes a predetermined frequency component corresponding to machining strength acting on the workpiece.

5. The apparatus according to claim 1, further comprising a smoothing circuit coupled with said exciting current detector for averaging said detection signals over time and for outputting signals when both eccentricity and distortion are not present on a machining face of the workpiece.

6. An apparatus for detecting machining conditions of an electromagnetically supported workpiece, comprising:

an exciting current supply circuit for generating an exciting current dependent on determined machining conditions of the workpiece;

electromagnetic bearing means coupled to the exciting current supply circuit and including at least one electromagnet controllable by the exciting current for electromagnetically supporting at least one a work spindle for holding the workpiece and a tool spindle in a predetermined rotating position;

exciting current detecting means coupled to the exciting current supply circuit for detecting the exciting current and generating detection signals responsive to variations of the predetermined rotating position;

filtering means coupled to the exciting current detecting means for filtering the detection signals and generating filtered detection signals; and comparing means coupled to the filtering means for comparing the filtered detection signals with respective values dependent on predetermined machining conditions and operable for determining the machining conditions of the workpiece.

7. An apparatus for detecting machining conditions of an electromagnetically supported workpiece according to claim 6; wherein the filtering means comprises a plurality of frequency band pass filters.

8. An apparatus for detecting machining conditions of an electromagnetically supported workpiece according to claim 7; wherein the plurality of frequency band pass filters includes a workpiece rotational frequency band pass filter for passing a predetermined frequency component corresponding to eccentricity of a machining face of the workpiece.

9. An apparatus for detecting machining conditions of an electromagnetically supported workpiece according to claim 7; wherein the plurality of frequency band pass filters includes a workpiece rotational frequency partial band pass filter for passing a predetermined frequency component corresponding to sectional distortion of a machining face of the workpiece.

10. An apparatus for detecting machining conditions of an electromagnetically supported workpiece according to claim 7; wherein the plurality of frequency band pass filters includes a tool spindle rotary bending resonant frequency band pass filter for passing a predetermined component corresponding to machining strength acting on the workpiece.

11. An apparatus for detecting machining conditions of an electromagnetically supported workpiece according to claim 6; further comprising a smoothing circuit coupled with the exciting current detecting means for averaging the detection signals over time and for outputting signals when both eccentricity and distortion are not present on a machining face of the workpiece.

* * * * *